W. H. ELLIS.
WEIGHING MACHINE.
APPLICATION FILED AUG. 18, 1917.

1,321,726.

Patented Nov. 11, 1919.
4 SHEETS—SHEET 1.

Inventor
Walter H. Ellis

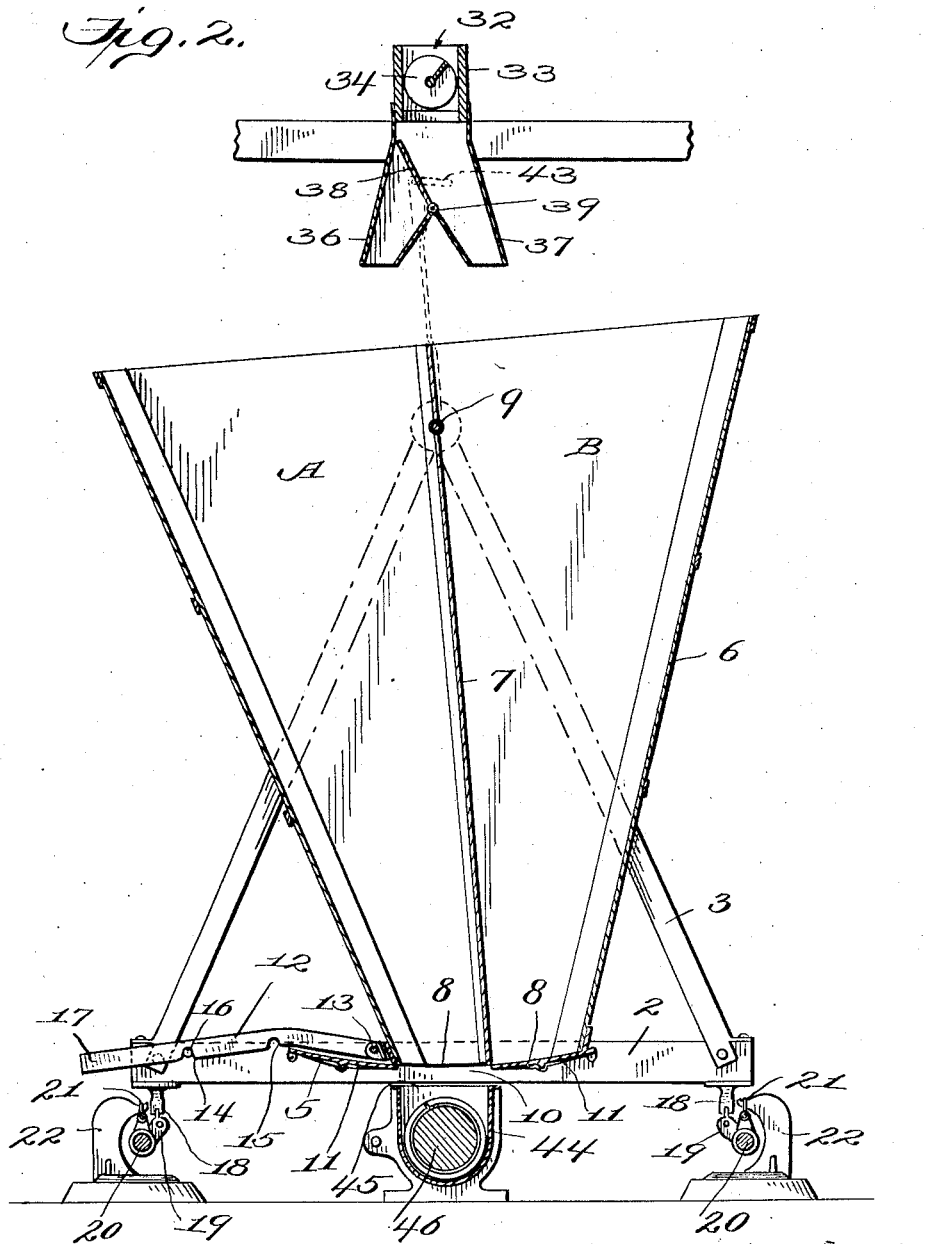

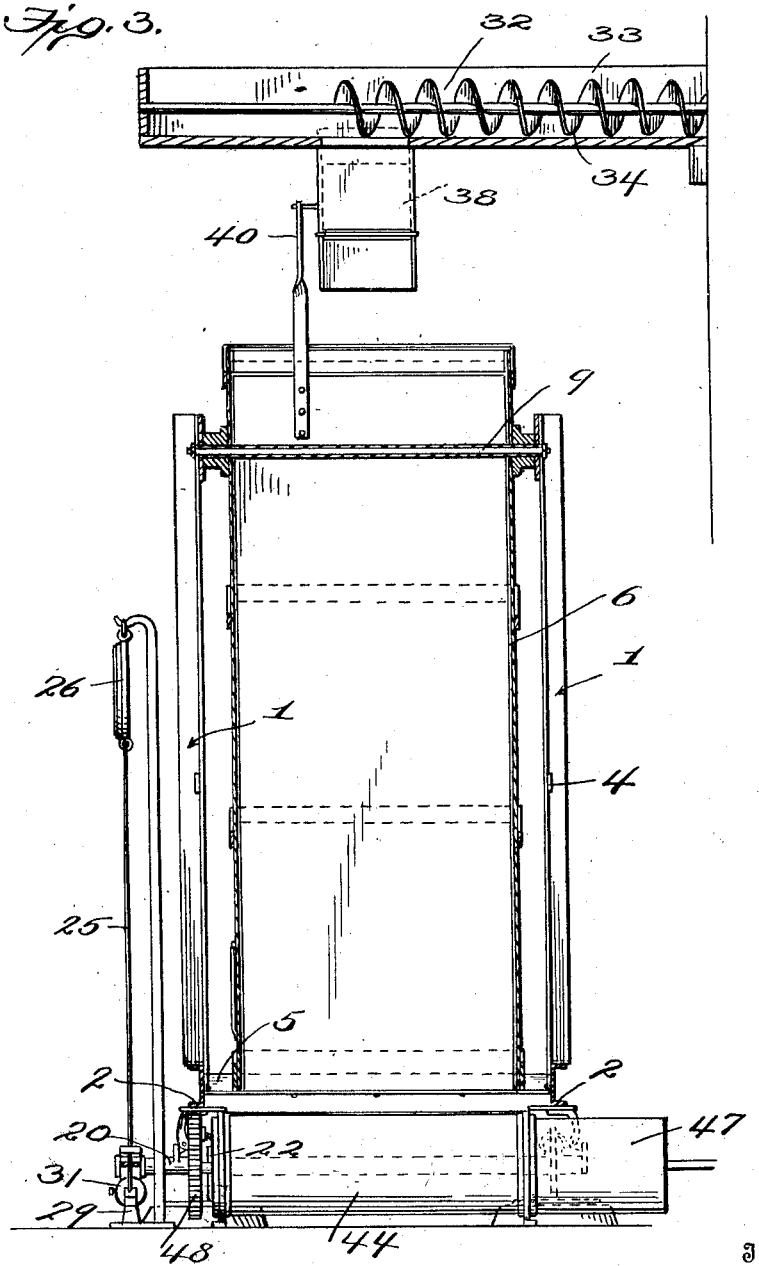

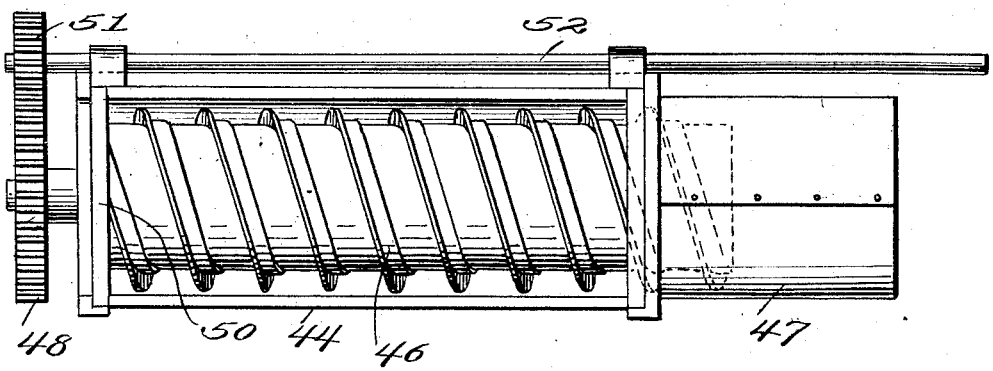
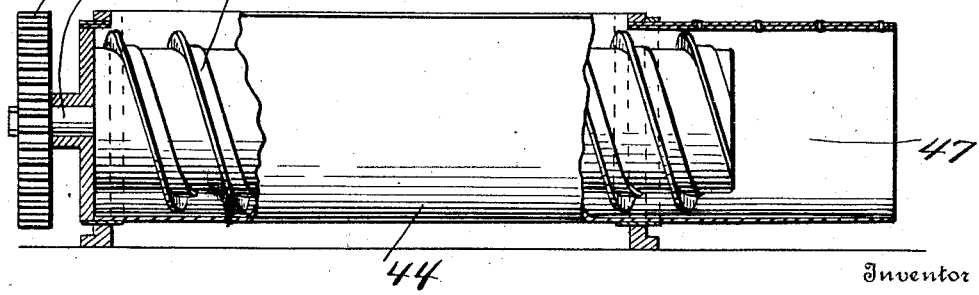

UNITED STATES PATENT OFFICE.

WALTER H. ELLIS, OF AUGUSTA, GEORGIA.

WEIGHING-MACHINE.

1,321,726.  Specification of Letters Patent.  Patented Nov. 11, 1919.

Application filed August 18, 1917. Serial No. 186,933.

*To all whom it may concern:*

Be it known that I, WALTER H. ELLIS, a citizen of the United States, residing at Augusta, in the county of Richmond and State of Georgia, have invented new and useful Improvements in Weighing-Machines, of which the following is a specification.

The present invention relates to improvements in weighing machines, and the object thereof is to provide novel apparatus for handling and weighing cotton seed as such seed is removed from the cotton at the time of ginning thereof, the apparatus according to the present invention receiving the seed from the gins during the ginning of each bale of cotton, weighing such seed, and then conveying away the weighed seed to a suitable point, the weighing operation being performed automatically and requiring the attention of an attendant only to the extent of noting the weight of seed from each bale after ginning thereof has been completed and tripping of the weigh hopper to discharge the weighed seed and permit it to receive seed from the next bale which occurs without delay in the ginning operations.

To these and other ends the invention consists in certain improvements, and combinations and arrangements of parts, all as will be hereinafter more fully described, the novel features being pointed out particularly in the claims at the end of the specification.

In the accompanying drawings:—

Fig. 2 represents a vertical section taken through the weighing machine, the supply chute, and the supply and control valve.

Fig. 3 represents a central vertical section through the apparatus on a plane perpendicular to the section represented by Fig. 2; and Figs. 4 and 5 show, in top plan and side elevation partly in section, the feeder for conducting the weighed charges of seed from the weighing machine.

Similar parts are designated by the same reference characters in the several views.

Figure 1:
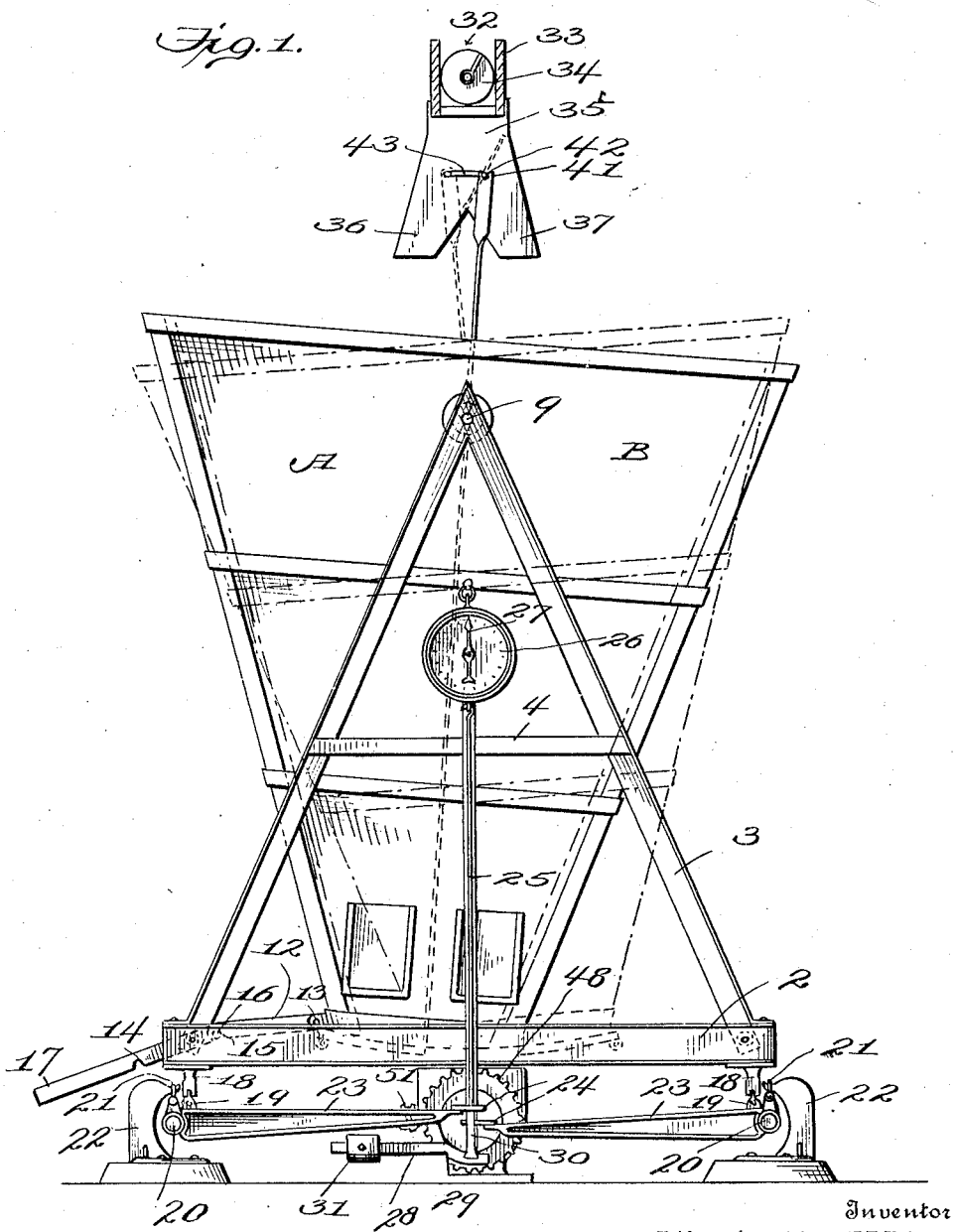
Figure 1 is a side elevation of a cotton seed weighing machine constructed in accordance with the present invention, the two positions of the weigh hopper and the supply and control valve being shown, respectively, by the full and dotted lines.

Weighing machines embodying the present invention may be used for various purposes, and especially where it is desirable or necessary to accurately determine the weight of successive charges of material. The invention is particularly adapted for use in conjunction with cotton ginning operations where it is desirable to ascertain the exact weight of seed obtained from each bale of cotton, this being accomplished by the present invention as distinguished from the prior practice of estimating the weight of seed which estimates were subject to error because of variations in the weight of seed obtained from cotton grown in different localities. The preferred embodiment of the invention is shown in the accompanying drawings and will be hereinafter described in detail, but it is to be understood that the invention is not restricted to the precise construction and arrangement shown, as equivalent constructions are contemplated and will be included within the scope of the claims.

In the present instance, the weighing machine comprises generally a frame composed of a pair of side members 1 preferably of angle iron. Each side member has a horizontal base rail 2, preferably of channel cross-section, and the side member is completed by the upwardly converging channel bars 3 which are rigidly connected or united at their upper ends. The bars 3 may be connected by a cross-bar 4 and the base rails 2 of the side members of the frame are connected by a transverse plate 5. The weigh hopper 6 occupies a position between the side members of the frame, and this hopper has preferably a tapering or approximately conical form, its narrow portion being at the bottom thereof. Also, this hopper is divided into a pair of laterally spaced bins or compartments A and B by a central vertical partition 7. The compartments or bins A and B are preferably of equal capacity, and the bottom of each compartment or bin has an opening 8. The hopper is suspended to swing or rock on a pivot 9 which connects the upper ends of the side frames 1 and preferably extends through the upper portion of the hopper. The transverse plate 5 which spans the space between the bottom rails 2 of the frame constitutes a valve or discharge controlling means for the compartments or bins of the hopper. This plate 5 is curved concentrically with the axis 9 of the hopper and it has a central discharge opening 10 which is preferably equal in area to the area of either of the openings 8 of the hopper, and this plate 5 has solid or imperforate end portions 11 which are of an area equal to or somewhat greater than that of each of the discharge openings 8 in the hopper. The hopper is capable of rocking on the pivot or axis 9 to enable it to occupy either of two positions. These two positions are shown, respectively, by the full and dotted lines in Fig. 1 and the hopper is shown in one of its two positions in Fig. 2. In each of these positions, the discharge opening 8 in one of the compartments or bins of the weigh hopper will be in register with the central opening 10 in the plate 5 while the discharge opening of the other compartment or bin of the hopper will be covered and hence closed by a solid or imperforate end portion of the plate 5. As shown in Fig. 2, the discharge opening 8 of the compartment or bin A of the hopper is in register with the discharge opening 10 in the plate 5, while the discharge opening of the compartment or bin B is closed by the right-hand solid or imperforate portion 11 of the plate 5. When the position of the hopper is reversed, the discharge opening 8 of the bin or compartment A will be drawn over the left-hand solid or imperforate portion of the plate 5 while the discharge opening of the compartment or bin B will be brought into register with the central discharge opening 10 of the plate 5. Means is preferably provided for retaining the hopper in either of these two positions, the hopper being moved automatically into its alternate positions as will herinafter appear. The hopper-positioning means consists preferably of a lever 12 which is pivotally attached to one side of the lower outlet end of the hopper at 13 and is provided with a pair of notches 14 and 15 which are adapted to alternately engage a pin or cross-bar 16 fixed to one or both of the base rails 2, the outer or free end of the lever forming a handle 17. When the notch 14 of the lever 12 engages the projection 16, the compartment or bin A will be in discharging position, as shown in Fig. 2, and when the notch 15 of the lever 12 engages the projection 16, the compartment or bin B will be in discharging position.

Appropriate weighing mechanism is provided for the hopper. Preferably, and as shown, the hopper and its supporting frame are mounted on weighing apparatus and this weighing apparatus is preferably of a type which will automatically balance the load of seed in the hopper and will indicate the weight thereof. As shown, the frame for the hopper has on its corners lugs 18 which rest upon cranks 19 fixed to rock shafts 20, the latter being suspended by the eyes 21 from stationary supports 22 which are located upon a cement or other appropriate foundation. A beam 23 is fixed to each rock shaft, these beams being located at one side of and beneath the frame and they extend inwardly or toward one another. The inner ends of these beams are attached to lugs 24 and these lugs are attached to a rod or cable 25 which in turn is connected to a spring balanced indicator 26 having a pointer 27 which is movable to different degrees corresponding to the varying weights of the different charges of seed received by the apparatus, and this pointer in coöperation with the dial indicates directly the weight of each charge of seed. Preferably, means is provided for balancing the weight of the hopper and its frame whereby the indicator 26 will show the net weight of each charge of seed. As shown, a counterbalance for the hopper and its frame is provided which comprises a beam 28 which is mounted to rock on a stationary fulcrum 29 and has one end arranged to bear upwardly against a standard 30, the latter being connected to and operating on the lugs 24 to which the beams 23 are attached. The other end of the beam 28 carries a weight 31 which may be set at an appropriate point along the length of this beam to balance the weight of the hopper and its carrying frame. With such an arrangement the hopper when empty will be balanced by the beam 28 and when seed is introduced into the hopper the weight of the seed will bear down the inner ends of the beams 23, thereby causing the rod 25 to produce tension on the spring balance 26 which will vary according to the weight of seed, and the pointer 27 will move around the dial to different degrees, according to the different weights of the charges of seed.

The seed is conducted to the weighing machine from the gins by a conveyer 32 which preferably comprises a trough 33 and an appropriately driven screw 34, the trough communicating with a discharge chute 35 which has two divergent spouts or outlets 36 and 37 respectively, these spouts or outlets being located at opposite sides of the pivot or axis 9 of the weigh hopper. A valve is provided in the chute for directing all the seed to either of these outlets, the other outlet at such time being closed.

Preferably, and as shown, the valve is in the form of a plate 38 which is pivoted in the chute on the axis 39 and the plate is adapted to swing into either of two positions where its upper or free edge will engage one of the opposite walls of the chute, thus providing a free passage between the conveyer and one of the spouts or outlets and completely closing the other spout or outlet. According to the present invention, this valve or controlling plate is operated automatically by the movement of the weigh hopper about its pivot or axis whereby the seed with be directed alternately into the respective bins or compartments of the weigh hopper preparatory to the successive weighing operations. The operating means for the valve comprises preferably a rigid arm 40 which is fixed to the partition 7 of the hopper and projects upwardly therefrom, this arm being operatively connected to the valve 38 by a fork 41 on the arm which coöperates with a pin 42 fixed to the valve, this pin operating through a slot 43 formed in the side wall of the chute 35.

The weighed charges of seed are conducted from the weighing apparatus by a feeder located beneath the discharge controlling plate 5. This feeder preferably comprises a trough 44 having an opening 45 in its top which registers with the opening 10 in the plate 5, and a screw 46 serves to move the seed received by the trough 44 longitudinally of the trough and into a conduit 47 which may conveniently conduct the seed to the air pipe conveyer or elevator. The driving means for the screw 46 preferably comprises a gear 48 which is fixed on the shaft 49 of the screw beyond the closed end 50 of the trough, a pinion 51 which coöperates with the gear 48, and a suitably driven shaft 52 which carries the pinion.

The operation of the apparatus may be described, briefly, as follows:—

Before the commencement of the ginning of the bale of cotton, the hopper 6 is set in one of its two positions and it is retained in such position by the lever 12. The valve 38 will then occupy a position where it will direct the seed into the bin or compartment of the hopper which has its discharge opening closed by a solid or imperforate portion 11 of the plate 5. It may be assumed that the hopper occupies the position shown by the full lines in Fig. 1, in which case the bin or compartment A will receive the seed. The screws 34 and 46 at this time are also revolving. As the cotton seed comes over from the gins during the ginning of the bale of cotton, such seed is fed by the screw 34 into the chute 35 and the seed is directed by the valve 38 into the bin or compartment A of the weigh hopper. This operation continues until the ginning of the bale of cotton has been completed, whereupon the flow of seed to the weighing machine will stop and, in the meantime, the indicator pointer 27 which has advanced around the dial of the indicator in response to the increasing weight of the seed in the weigh hopper will show directly the weight of the charge of seed obtained from the ginned bale. After this weight has been noted by the attendant, the lever 12 is raised sufficiently to disengage it from the pin 16. The result of this is that the charge of seed in the bin or compartment A of the weigh hopper and which is at one side of the pivot or axis 9 thereof will automatically swing the weigh hopper to its other position, bringing the discharge opening 8 of the bin or compartment A into register with the discharge opening 10 in the plate 5, and bringing the discharge opening of the bin or compartment B over the right-hand imperforate portion 11 of the plate 5, as shown in Fig. 2. Simultaneously, the arm 40 operates on the valve 38, causing it to reverse its position, closing the left-hand spout 36 and opening the right-hand spout 37. The bin or compartment B is then ready to receive the seed obtained in the ginning of the next succeeding bale of cotton without interrupting the ginning operation, and the seed in the bin or compartment A is discharged therefrom through the outlet 10 and such seed is conveyed away by the screw 46.

I claim as my invention:—

1. In a weighing machine, the combination of a swinging weigh hopper having a plurality of compartments therein, each compartment having a bottom outlet, lower stationary valve members disposed under and with which the bottom of the hopper has relative movement, the said valve members having a discharge opening between them, the bottom openings of the hopper being caused to alternately register with the discharge opening between the valve members, means connected to one side of the lower outlet end of the hopper for retaining the latter at one position until released, and a fixed discharge chute above the hopper provided with divergent spouts and a valve above the spouts, means being provided for automatically shifting the valve by the movement of the hopper for directing material into the different compartments of the hopper.

2. In a weighing machine, the combination of a swinging weigh hopper centrally disposed on a horizontal axis and having a pair of compartments arranged at opposite sides of said axis, the compartments being fully opened at their upper ends and converging toward their lower ends where discharge openings are provided and having coöperating means for alternately opening and closing the same, means governed by the swinging movement of the hopper for causing discharge of material alternately from the said compartments, the hopper also having upwardly projecting fixed means, a fixed chute above the hopper provided with divergent spouts on opposite sides of the pivot of the hopper, the chute having a valve above the spouts movably controlled by the upwardly projecting fixed means of the swinging hopper for directing material alternately into said compartments and means for retaining the hopper at one position until released.

3. In a weighing machine, the combination of a swinging weigh hopper suspended from a centrally located pivot and having compartments located at opposite sides of said pivot and provided with upper fully open ends, the compartments also having open bottoms, oppositely disposed valve devices having stationary positions relatively to the lower end of the hopper, the valve devices having a discharge opening between the same for permitting alternate outlet of the contents of the respective compartments and means for retaining the hopper at one position until released, and a fixed chute above the hopper provided with means for alternately directing material into the said compartments, the hopper having means for controlling the automatic action of the chute.

4. In a weighing machine, the combination of a swinging weigh hopper suspended from a centrally located pivot and having separate compartments extending full length thereof on opposite sides of the pivot and open at the bottom, means operating to alternately open and close the bottoms of the compartments in accordance with the swinging movement of the hopper, a fixed supply chute having divergent outlet spouts arranged above the respective compartments on opposite sides of the pivot of the hopper and provided with a valve above the said spouts which alternately opens one and closes the other of the latter in accordance with the swinging movement of the hopper, and means for retaining the hopper at one position until released, and means fixed to and extending above the hopper and engaging a portion of the valve of the chute to shift the latter in accordance with the movement of the hopper.

5. In a weighing machine, the combination of a pivotally suspended hopper having compartments at opposite sides of its axis extending fully from the top to the bottom of the hopper in converging relation, the bottoms of the compartments being open for discharging the contents thereof, means for automatically opening and closing the bottoms of the compartments in accordance with the swinging movement of the hopper, and means for retaining the hopper at one position until released, a fixed supply chute having separated divergent outlets located above the respective compartments, a reversible valve in the chute above the divergent outlets for alternately closing one outlet and opening the other outlet, and a single arm movable with the hopper and extending above the top of the latter and coöperative with the valve in the chute to automatically operate said valve.

6. In a weighing machine, the combination of a frame, a weigh hopper pivotally suspended by said frame and having compartments located at opposite sides of its axis, the position of the hopper being reversible automatically by the weight of material in one of its compartments, means for controlling the discharge of material from the compartments, and a lever pivotally connected to one side of the hopper and having removable engagement with a portion of the frame for temporarily securing the hopper in fixed relation to the frame to retain the hopper from movement during introduction of material into a compartment thereof and releasable to permit reversal of position of the hopper under the influence of the material in such compartment.

7. In a weighing machine, the combination of a frame, with a base weighing mechanism having the base of the frame imposed thereon, a hopper pivotally suspended by said frame above the weighing mechanism and having compartments located at opposite sides of its axis, a discharge-controlling member curved concentrically with the pivotal axis of the hopper and having an outlet therein arranged to register with the respective compartments of the hopper, and releasable means for retaining the hopper in each of its two positions where the opening in said member is in register with said compartments.

8. In a weighing machine of the class described, the combination of a weigh hopper having separate compartments with bottom outlets, the hopper being mounted to have a swinging movement, means for separately directing material into the different compartments of the hopper, and means for retaining the hopper at one position until released, and weighing mechanism at the lower portion of the hopper and supporting the latter, said weighing means including a lower beam with means interposed between the same and the main elements of the weighing mechanism for balancing the weight of the hopper and its frame and a direct reading indicator for registering the net weight of each charge of material in each compartment, a standard being interposed between the said beam and reading indicator mechanism.

9. The combination of a pivotally supported weigh hopper having compartments located at opposite sides of its axis, a fixed chute having divergent spouts for directing material alternately into said compartments, an outlet through which said compartments alternately discharge their contents, and a feeder for removing the discharged material including a trough arranged below the lower portion of and in central relation to the hopper and to said outlet and a screw operative in said trough.

In testimony whereof I have hereunto set my hand in presence of two subscribing witnesses.

WALTER H. ELLIS.

Witnesses:
H. L. RUBENSTEIN,
C. F. AGRELL.

Copies of this patent may be obtained for five cents each, by addressing the "Commissioner of Patents, Washington, D. C."